(12) United States Patent
Bertrand

(10) Patent No.: US 7,099,765 B2
(45) Date of Patent: Aug. 29, 2006

(54) DIRECT DETERMINATION OF THE MAXIMUM GRIP COEFFICIENT ON THE BASIS OF MEASUREMENT OF THE CIRCUMFERENTIAL EXTENSION IN A SIDEWALL OF A TIRE

(75) Inventor: David Bertrand, Chamalieres (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/911,047

(22) Filed: Aug. 4, 2004

(65) Prior Publication Data
US 2005/0065698 A1    Mar. 24, 2005

(51) Int. Cl.
G06F 7/00 (2006.01)
B60T 8/66 (2006.01)
B60T 8/70 (2006.01)

(52) U.S. Cl. .................... 701/73; 701/80; 303/149
(58) Field of Classification Search ............ 701/73–74, 701/80; 73/146
See application file for complete search history.

(56) References Cited

U.S. PATENT DOCUMENTS

| | | | |
|---|---|---|---|
| 3,852,993 A | 12/1974 | Dobychin et al. | 73/12.06 |
| 4,715,662 A | 12/1987 | van Zanten et al. | 303/150 |
| 4,724,704 A | 2/1988 | Alain | 73/146.2 |
| 4,817,421 A | 4/1989 | Himmier | 73/146 |
| 4,836,257 A | 6/1989 | Mamada et al. | 152/209.16 |
| 4,862,368 A | 8/1989 | Kost et al. | 701/74 |
| 5,365,781 A | 11/1994 | Rhyne | 73/146 |
| 5,892,139 A | 4/1999 | Miyazaki | 73/9 |
| 5,913,240 A | 6/1999 | Drahne et al. | 73/146 |
| 5,964,265 A | 10/1999 | Bechener | |
| 6,021,367 A | 2/2000 | Pilutti et al. | 701/41 |
| 6,083,268 A | 7/2000 | Kelsey et al. | 703/7 |
| 6,256,894 B1 | 7/2001 | Naruse et al. | 33/203.12 |
| 6,263,994 B1 | 7/2001 | Eitel | 180/219 |
| 6,266,600 B1 | 7/2001 | Miyazaki | 701/71 |
| 6,338,270 B1 | 1/2002 | Mancosu et al. | 73/146 |
| 6,339,956 B1 | 1/2002 | Huinink et al. | 73/146 |
| 6,430,993 B1 | 8/2002 | Seta | 73/146 |
| 6,550,320 B1 | 4/2003 | Giustino | |
| 6,556,911 B1 | 4/2003 | Matsuno | 701/80 |
| 6,561,018 B1 | 5/2003 | Mancosu et al. | 73/146 |
| 6,564,625 B1 | 5/2003 | Ishiyama | 73/146 |
| 6,597,980 B1 * | 7/2003 | Kogure | 701/80 |
| 6,666,079 B1 | 12/2003 | Poulbot et al. | 73/146 |
| 6,761,060 B1 | 7/2004 | Mancosu et al. | 73/146 |
| 6,763,288 B1 | 7/2004 | Caretta et al. | 701/1 |
| 6,772,058 B1 | 8/2004 | Miyazaki | 701/71 |
| 6,888,471 B1 | 5/2005 | Elsner et al. | 340/686.3 |

(Continued)

FOREIGN PATENT DOCUMENTS

DE     3939917     6/1991

(Continued)

Primary Examiner—Yonel Beaulieu
(74) Attorney, Agent, or Firm—Fitzpatrick, Cella, Harper & Scinto

(57) ABSTRACT

A method of determining the grip coefficient $\mu$ in the contact area of a tire on a road includes the steps of selecting a plurality of fixed points in space (that is to say ones that are fixed in the reference frame associated with the vehicle) which points lie at different azimuths along the circumference in at least one sidewall of the tire, obtaining a corresponding number of measurements of circumferential distance variation (extension or contraction) at these fixed points when the tire is rolling on the road, and the measurement signals are processed so as to extract the grip coefficient $\mu$.

11 Claims, 11 Drawing Sheets

U.S. PATENT DOCUMENTS

| | | | |
|---|---|---|---|
| 6,962,075 B1 | 11/2005 | Bertrand | 73/146 |
| 2002/0157746 A1 | 10/2002 | Merino-Lopez et al. | |
| 2004/0158414 A1 | 8/2004 | Bertrand | 701/41 |
| 2005/0005692 A1 | 1/2005 | Giustino | 73/146 |
| 2005/0065699 A1 | 3/2005 | Bertrand | 701/80 |
| 2005/0159874 A1 | 7/2005 | Bertrand | 701/80 |

FOREIGN PATENT DOCUMENTS

| | | |
|---|---|---|
| DE | 4435448 | 4/1995 |
| EP | 0937615 | 8/1999 |
| EP | 0949496 | 10/1999 |
| EP | 1026490 | 8/2000 |
| EP | 1030170 | 8/2000 |
| EP | 1095794 | 5/2001 |
| JP | 2270682 | 5/1990 |
| WO | WO 01/36241 | 5/2001 |
| WO | WO 01/92078 | 12/2001 |

\* cited by examiner

Figure 7
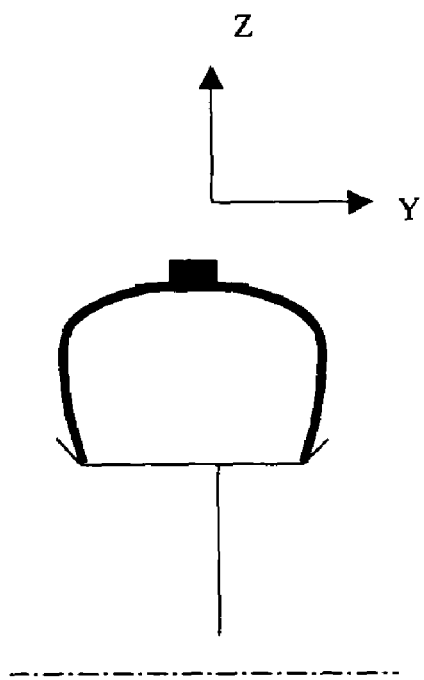
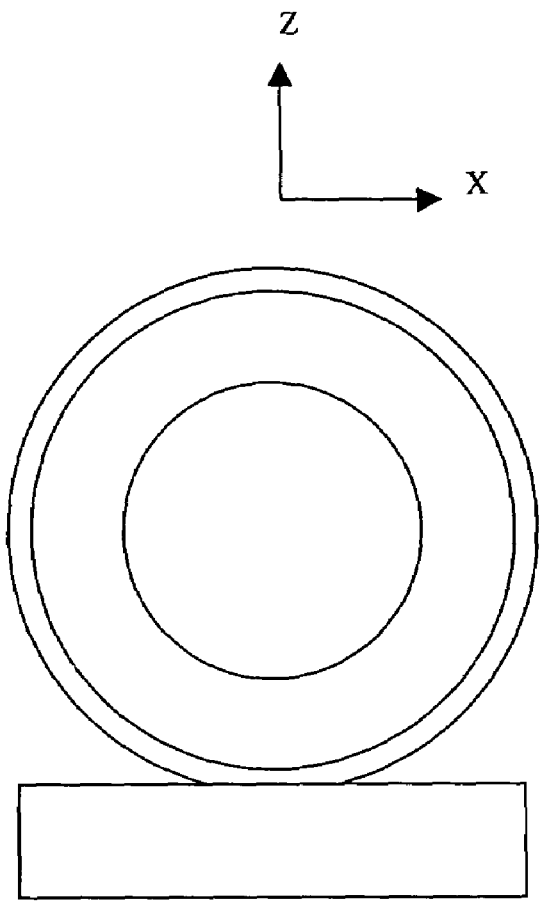
Figure 8

V2−V1

V1+V2

DIRECT DETERMINATION OF THE MAXIMUM GRIP COEFFICIENT ON THE BASIS OF MEASUREMENT OF THE CIRCUMFERENTIAL EXTENSION IN A SIDEWALL OF A TIRE

BACKGROUND AND SUMMARY

The present invention relates to the evaluation of the grip of a vehicle on a road. It relates more particularly to the determination of grip characteristics between the road and a vehicle wheel fitted with an elastic tire, such as an inflated pneumatic tire or a non-pneumatic elastic tire, which rolls on the road.

The present invention also relates to the various electronic assistance devices used, for example, for antilock control of the brakes of a vehicle or antiskid control of the drive wheels, control of the direction of a vehicle or other forms of control or monitoring, as for instance the tire pressures. It is known that such devices reconstruct the grip coefficient ($\mu$) of the tires on the road by calculation, without having carried out any measurement either of the grip coefficient or of the forces developed in the contact of the tires with the ground. Even though these devices provide significant assistance and extra safety, their operation would benefit greatly from the use of a measured value, or a value estimated on the basis of real measurements carried out on the tire during operation.

For this reason, it is an object of the present invention to provide a way of evaluating the grip of a vehicle on a road, and more precisely of its wheels or tires or elastic tires, these terms being regarded as equivalent in the context of the present invention. It relates more particularly to the determination of grip characteristics between the road and a vehicle wheel fitted with an elastic tire, such as an inflated pneumatic tire or a non-pneumatic elastic tire, which rolls on the road.

The various electronic assistance devices mentioned above would therefore usefully benefit from "real-time" indications of the grip conditions liable to affect the handling of a vehicle, especially when it undergoes an acceleration due to a driving force or a braking force, or due to a change of direction of movement. The invention aims to provide a method of achieving this efficiently.

In what follows, "maximum grip potential" refers to the ratio between the maximum tangential force (transverse or longitudinal, or both combined) and the normal force which the wheel can experience. In the text, this is also denoted by the term "maximum grip coefficient", or the letter $\mu$.

"Overall forces" refers to the three components of forces Fx, Fy and Fz applied to the center of the wheel, and the self-alignment torque N about the Z axis.

With a view to estimating the maximum grip potential, it has been proposed that the tread of a tire, or certain specially adapted elements of the tread, be fitted with sensors intended to measure or estimate the forces generated locally, in particular under slip conditions. Although highly promising, these approaches nevertheless involve certain intrinsic difficulties. Indeed, it is difficult to ensure correct operation of a sensor in this zone of the tire, in particular when there is a wear of the tread, throughout the life of the tire. Furthermore, the estimates provided by these sensors are highly local and sensitive to the surface condition of the road.

Since the intention is actually to estimate the maximum grip potential of the wheel, this still remains to be determined on the basis of the measured local potential.

The invention described in detail here differs from these local approaches. It proposes to use a measurement of the overall deformations of the tire so as to obtain information about the maximum grip potential of the wheel on the ground. Indeed, when the tire is subjected to a constraint, the point of application of the forces being applied in the contact area depends, inter alia, on the maximum grip coefficient because, as soon as a part of the contact area of the wheel on the road is slipping, its contribution to the tangential forces is saturated at a level which depends on the grip coefficient. The deformations of the tire are themselves sensitive to the movement of this point of application. In particular, the circumferential extension of the sidewalls, which is sensitive to the applied forces, is also sensitive to the movement of the point of application of the forces in the contact area.

The proposed method uses measurements of the circumferential deformations of the sidewall at certain azimuths of the tire in order to allow estimation of the maximum grip coefficient.

In order to provide a good estimate of $\mu$, the method requires that there be a slip zone in the contact area, which may be created either by a special design of the tire or by a sufficient level of constraint applied to the tire. In order to obtain reliable information even when there is little slipping, the invention proposes that the percentage of the potential used be estimated in addition to the maximum grip potential. The reason is that this quantity has the advantage of being easier to estimate as an absolute value, even for small constraints.

The method according to the invention for determining the grip coefficient $\mu$ in the contact area of a tire on a road includes the following steps:

selecting a plurality of fixed points in space, which lie at different azimuths along the circumference in at least one sidewall of the tire, carrying out a corresponding number of measurements of circumferential distance variation (extension or contraction) at these fixed points when the tire is rolling on the road, and the measurement signals are processed so as to extract the said grip coefficient $\mu$ from them.

Advantageously, the said grip coefficient $\mu$ is derived from at least 5 measurements of circumferential distance variation (extension or contraction) carried out in at least one sidewall of the tire, at 5 fixed points in space (that is to say ones that are fixed in the reference frame associated with the vehicle) which lie at different azimuths along the circumference.

The method of the invention is based on recognition of the fact that the forces acting between the tread of the tire and the road, as well as their distribution in the contact area, cause a substantial and reproducible deformation in the form of a circumferential extension or contraction of the sidewalls of the tires. This circumferential extension or contraction, if it is possible to measure it individually during rotation of the tire in real time, can make it possible to know at each instant the direction and magnitude of the forces acting on the tire, as well as the sign and the magnitude of the self-alignment torque exerted by the tire and the grip coefficient of the tire on the road.

According to one particular aspect, the invention proposes to estimate the circumferential contraction or extension of the sidewalls by measuring the distance between the threads of the carcass ply in the sidewalls. It is also possible to measure the distance between wires (for example two of them) which are placed in the sidewalls and experience movements correlated with those of the threads of the carcass ply. Measurement of the "thread separation" will be referred to below. It should be noted that, although this term is linked with the radial structure of a tire, the method applies not just to tires with a radial carcass. For instance, the term "thread separation" will be used to denote the average distance between two lines made on the sidewall at adjoining but different azimuths.

It should be noted that, in the event that the circumferential extension of the sidewalls is being measured within the sidewalls at a position different from their flexurally neutral fiber, the circumferential extension will include a component due to the flexure of the sidewall, in particular when passing through the contact area (a phenomenon also referred to as "bellying"). This component due to flexure is by no means a problem, and it can be exploited in order to increase the dynamic range of variation of the signals which the invention uses, by carrying out the extension measurement elsewhere than on the flexurally neutral fiber.

BRIEF DESCRIPTION OF THE DRAWINGS

The description below explains the invention in more detail with the aid of the appended figures, in which.

Figure 3A:
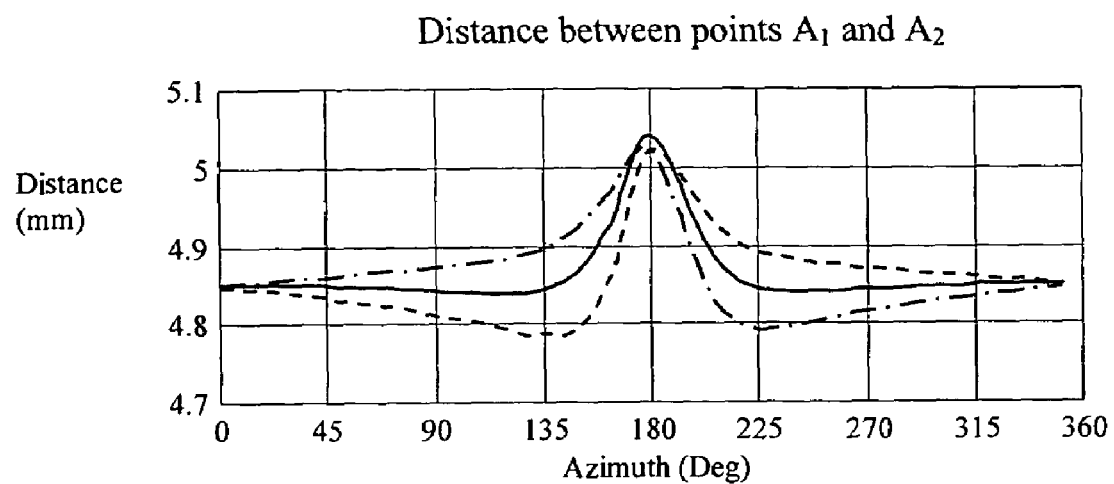
Figure 3B:
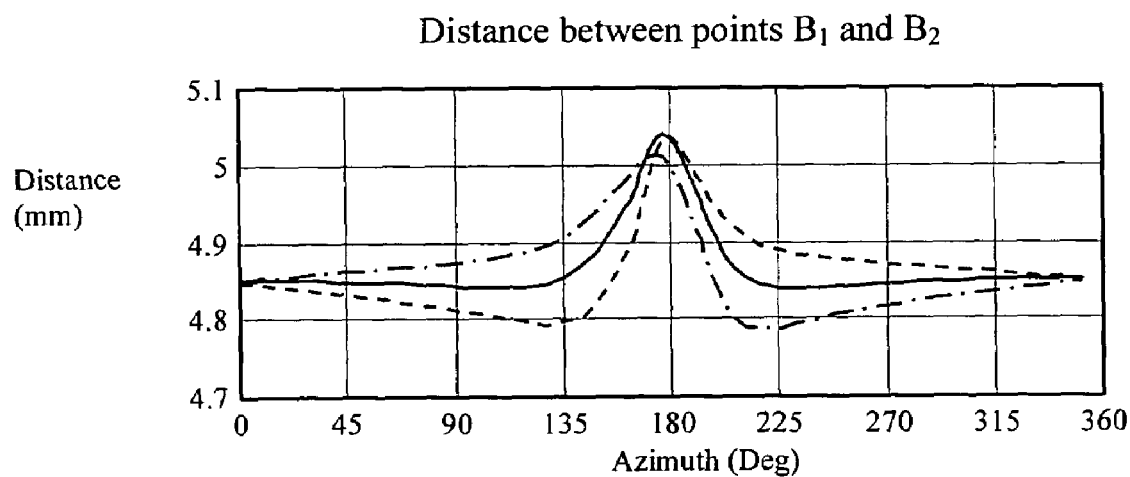
Figure 4A:
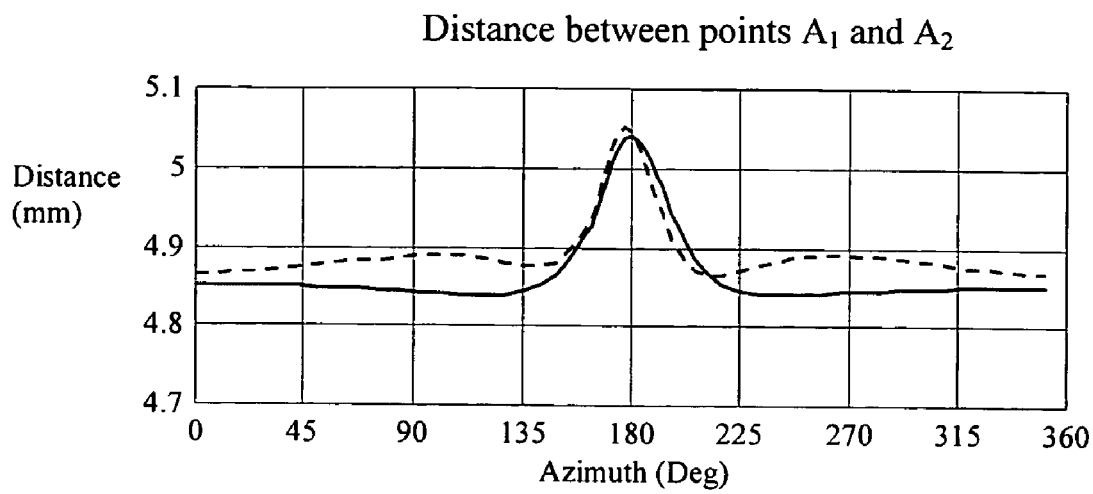
Figure 4B:
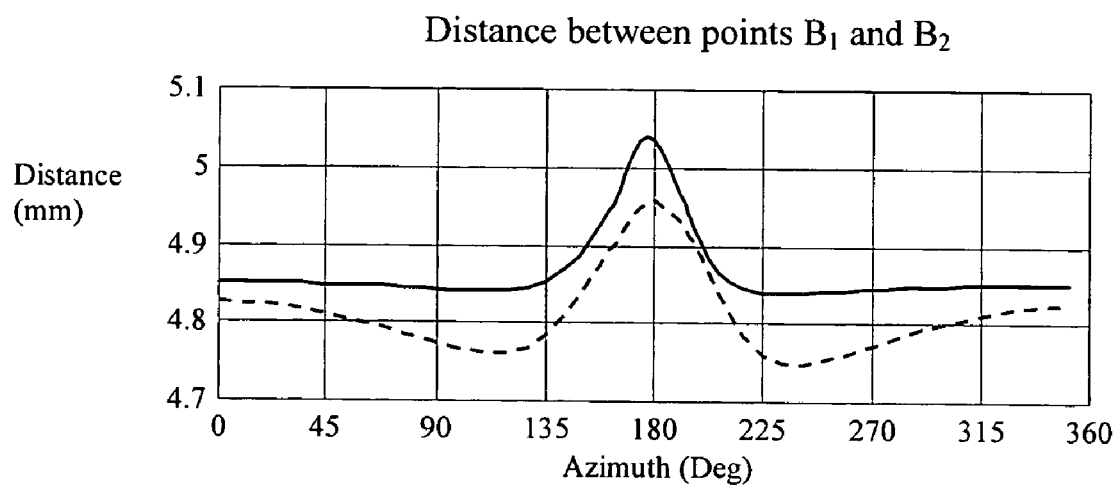
Figure 5:
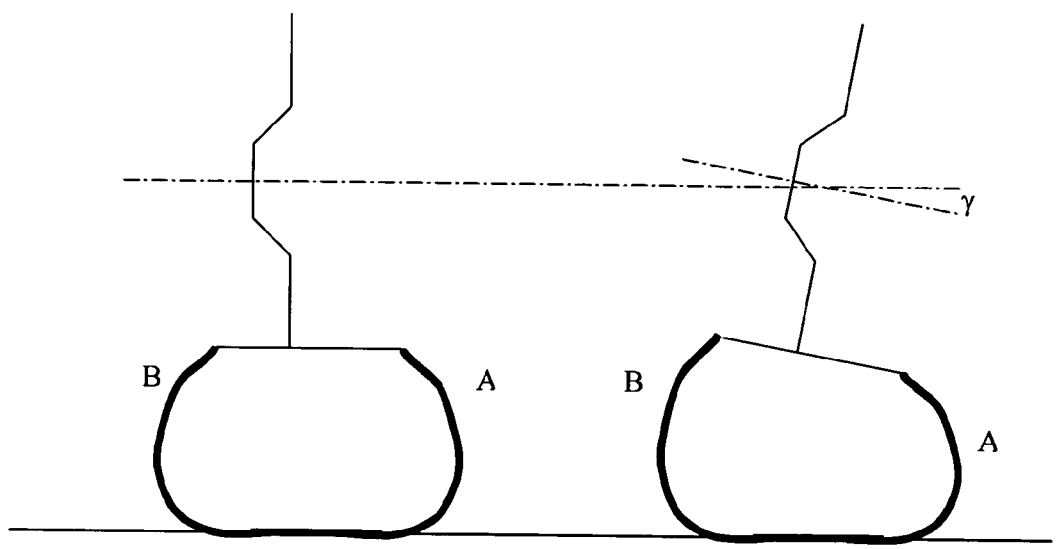
Figure 6A:
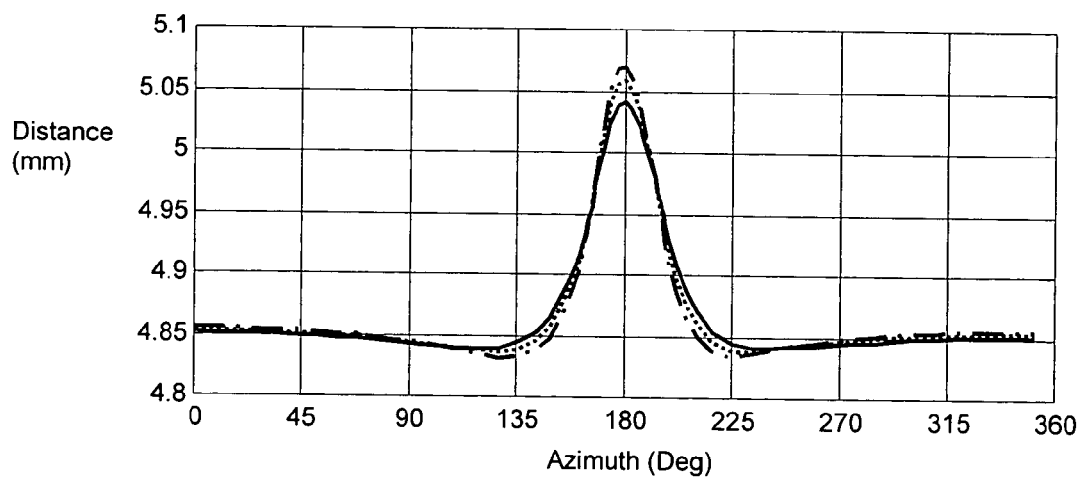
Figure 6B:
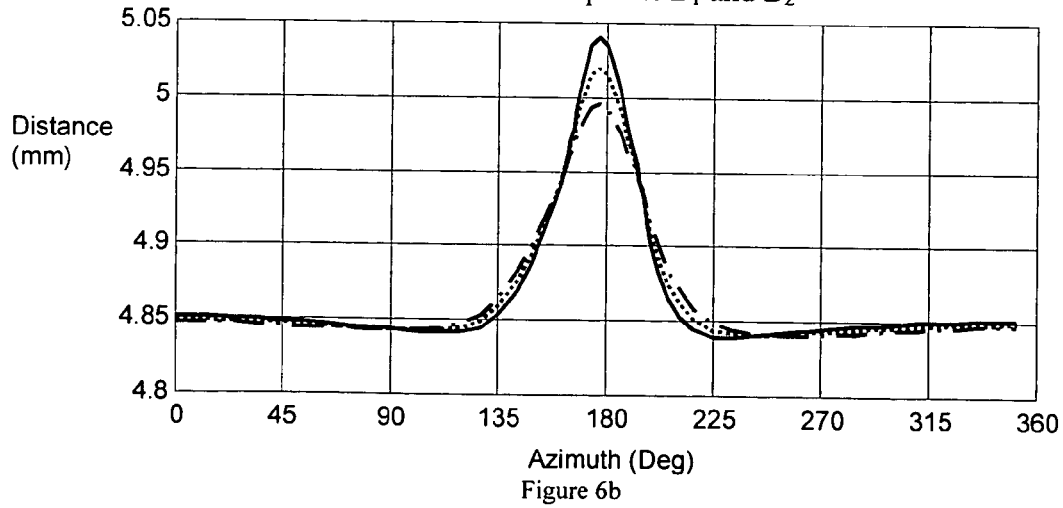
Figure 9:
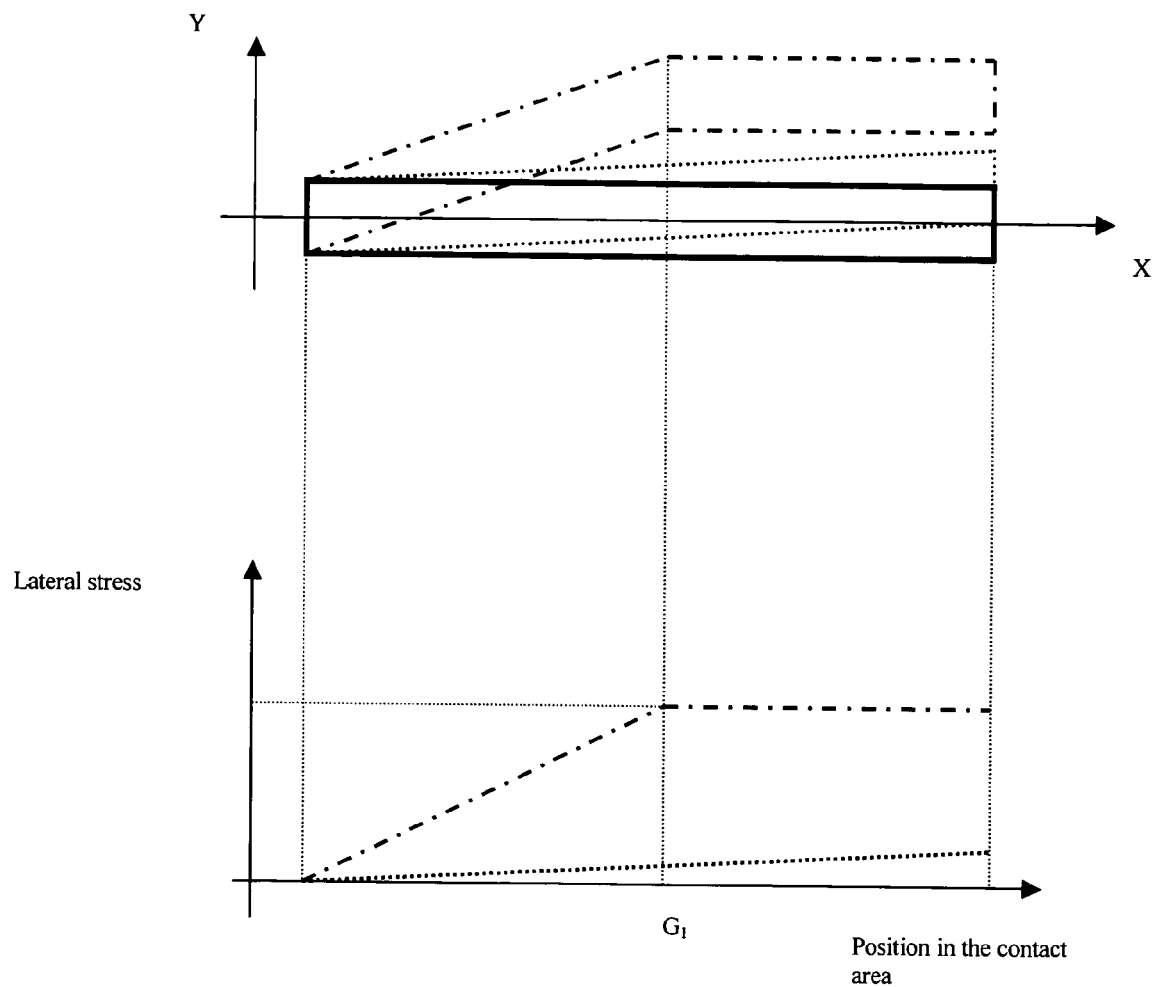
Figure 10:
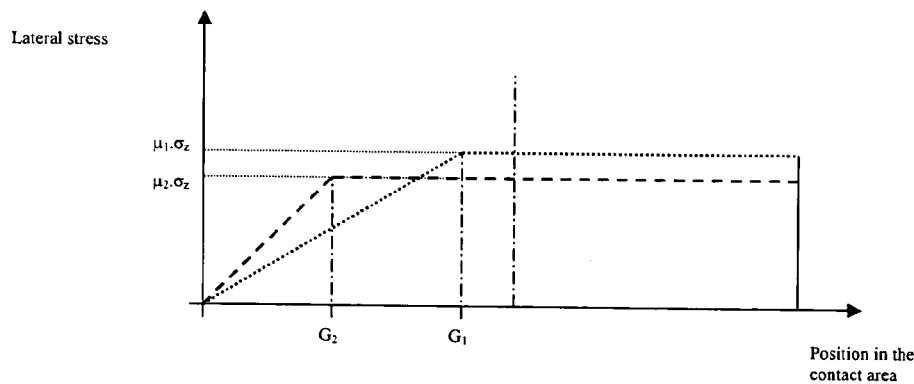
Figure 11:
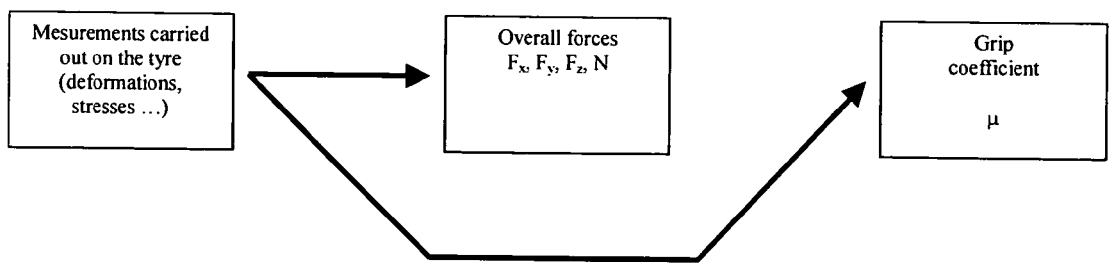
Figures 12A, 12B, 12C:
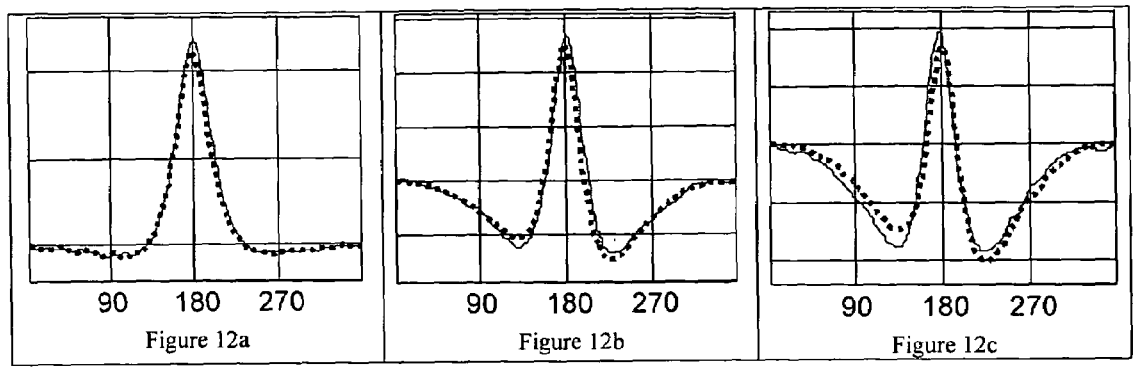
Figure 13:
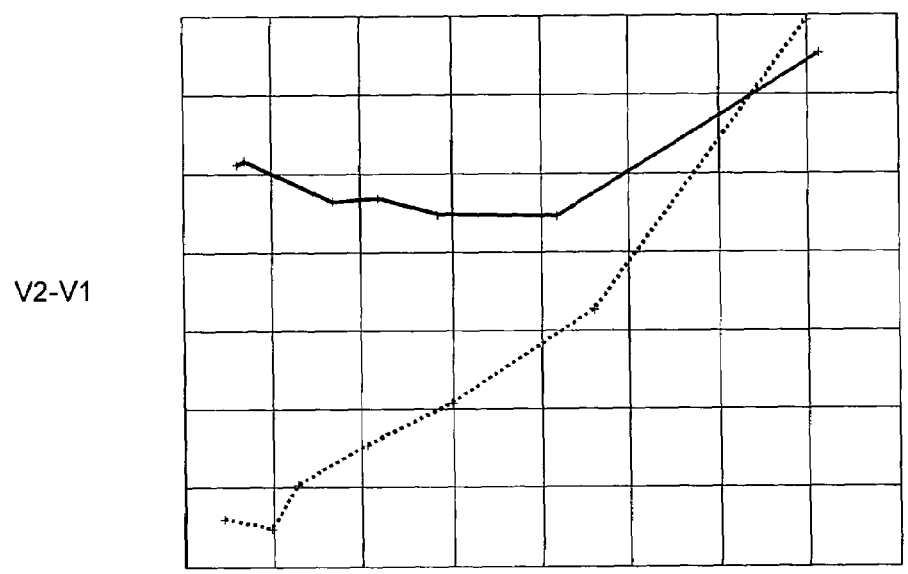

in which the solid curve corresponds to a vertical load of 400 daN, in which the dotted curve corresponds to a vertical load of 500 daN, in which the dotted and dashed curve corresponds to a vertical load of 300 daN;

FIGS. 3a and 3b show the effect of the component Fx:

in which the solid curve corresponds to a vertical load of 400 daN and without any force Fx, in which the dotted curve corresponds to a vertical load of 400 daN and a force of Fx 400 daN (driving force), in which the dotted and dashed curve corresponds to a vertical load of 400 daN and a force Fx of −400 daN (braking force);

FIGS. 4a and 4b show the effect of the component Fy:

in which the solid curve corresponds to a vertical load of 400 daN with no force Fy, in which the dotted curve corresponds to a vertical load of 400 daN with a force Fy of 280 daN;

FIG. 5 shows the deformation of the tire when a camber angle is applied,

FIGS. 6a and 6b show the effect of the camber on the circumferential deformation signals:

in which the solid curve corresponds to a vertical load of 400 daN with no forces Fx and Fy, and to a zero camber angle, in which the dotted curve corresponds to a vertical load of 400 daN with a camber angle of 2°, and in which the dotted and dashed curve corresponds to a vertical load of 400 daN with a camber angle of 4°;

FIG. 7 is a front view of a schematic tire for explanation of the invention;

FIG. 8 is a side view of a schematic tire for explanation of the invention;

FIG. 9 illustrates the shearing of a rib in the contact area, as well as the associated stresses;

FIG. 10 illustrates the effect of the coefficient of friction on the distribution of the forces;

FIG. 11 is a block diagram of the estimation of $\mu$ on the basis of the deformation measurements;

FIGS. 12a, 12b and 12c illustrate the effects of the maximum grip level on the circumferential extension signals, respectively for a force Fy of 0, 80 and 120 daN with a load of 400 daN and without a driving or braking torque. The solid curve corresponds to a maximum grip coefficient of 0.4 and the dotted curve corresponds to a grip coefficient of 1;

FIG. 13 shows the different relation which exists between the two indicators V1+V2 and V2−V1 depending on the value of the grip coefficient. The solid curve corresponds to a grip coefficient of 0.4 and the dotted curve corresponds to a coefficient of 1.

Figure 14:
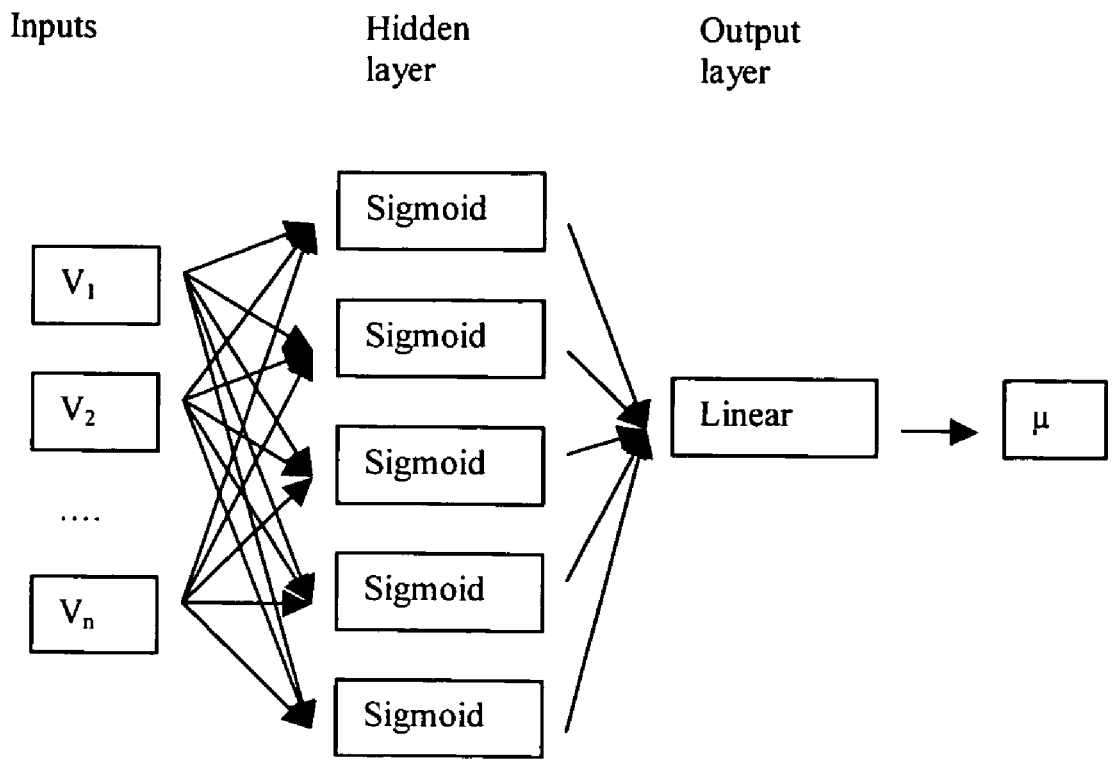
Figure 15:
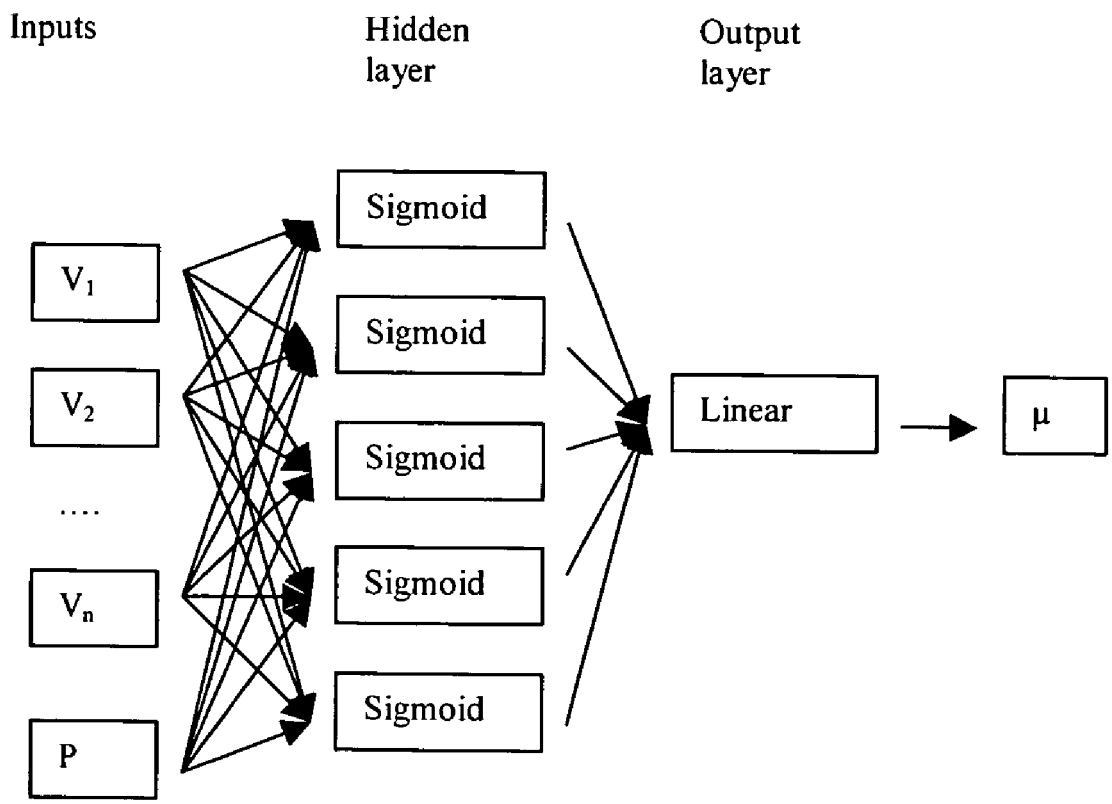
Figure 16:
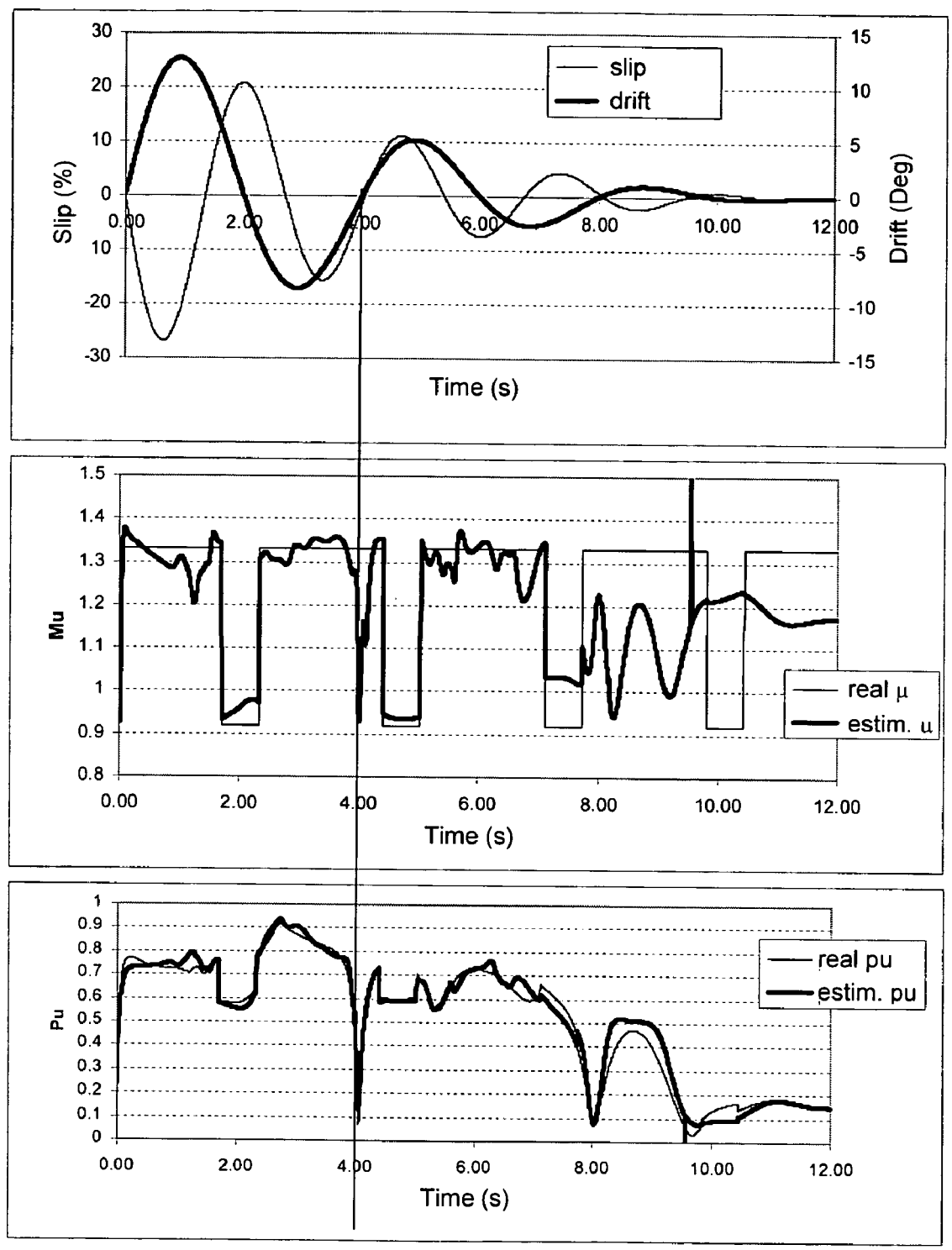

FIG. 14 shows the architecture of a neural network;

FIG. 15 shows the architecture of a neural network using the inflation pressure as an additional input;

FIG. 16 gives the results of the estimation of $\mu$ and of the percentage of the grip potential used.

DETAILED DESCRIPTION

Figure 1:
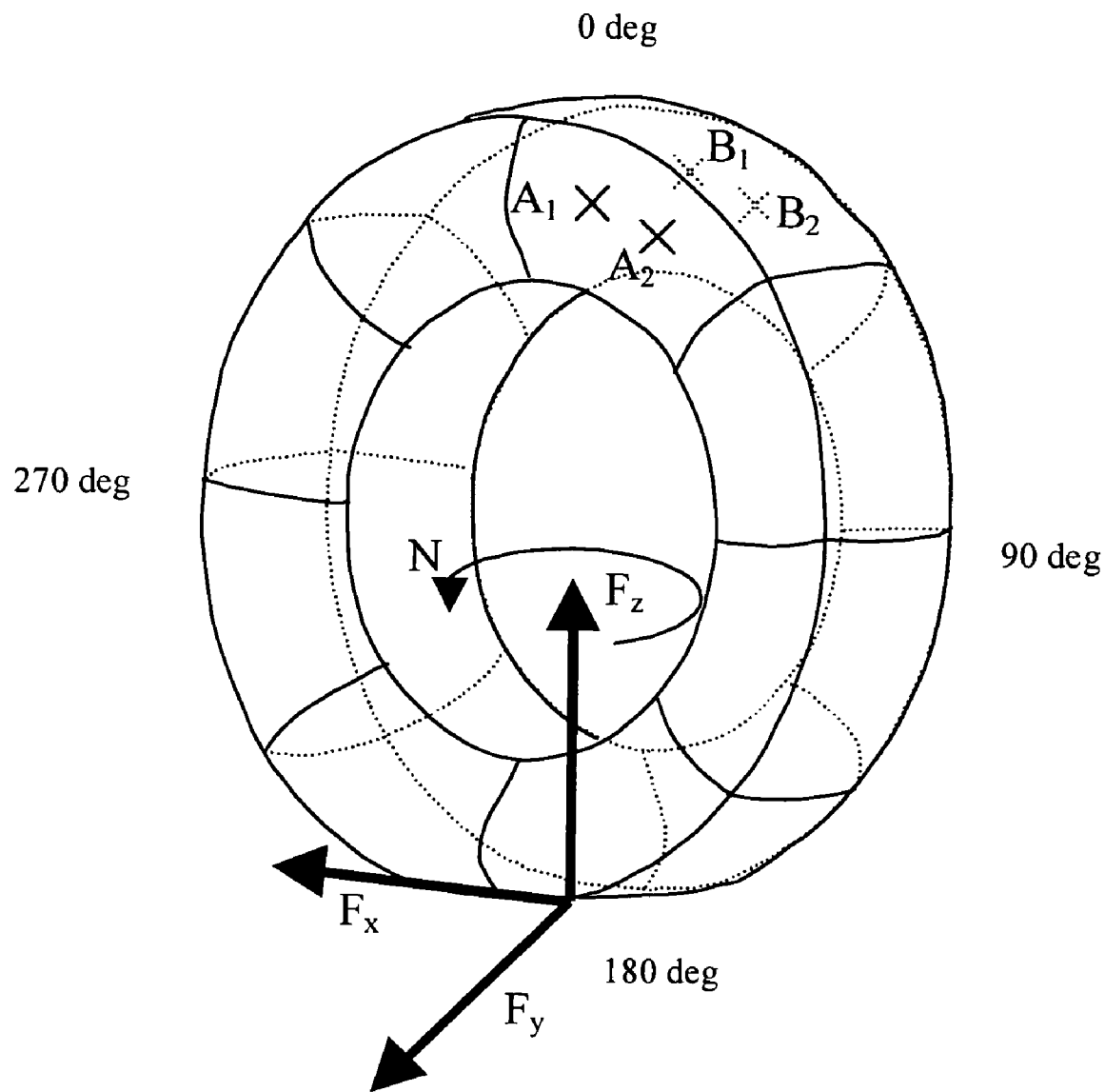
FIG. 1 is a perspective of a tire on which the conventions useful for understanding the invention are defined.

The method described here relies on the fact that each force applied to the tire in the contact area causes a modification of the circumferential extension of the sidewalls of the tire. The case of an inflated tire fitted on its wheel will be considered, on whose first sidewall two points $A_1$ and $A_2$ are identified (FIG. 1), which are placed on the same radius but are separated in the circumferential direction. On the second sidewall, at the same azimuths as $A_1$ and $A_2$ and on the same radius, two points $B_1$ and $B_2$ are selected. In the absence of any forces being applied to the tire, the distance which separates the two points is constant as a function of the angle of rotation of the tire-wheel assembly. The azimuth $\theta$ will be defined as the angle at which the circumferential extension of the sidewalls is being analyzed. The origin of the azimuth is taken on the opposite side from the center of the contact area. The center of the contact area therefore has the azimuth 180°.

Figure 2A:
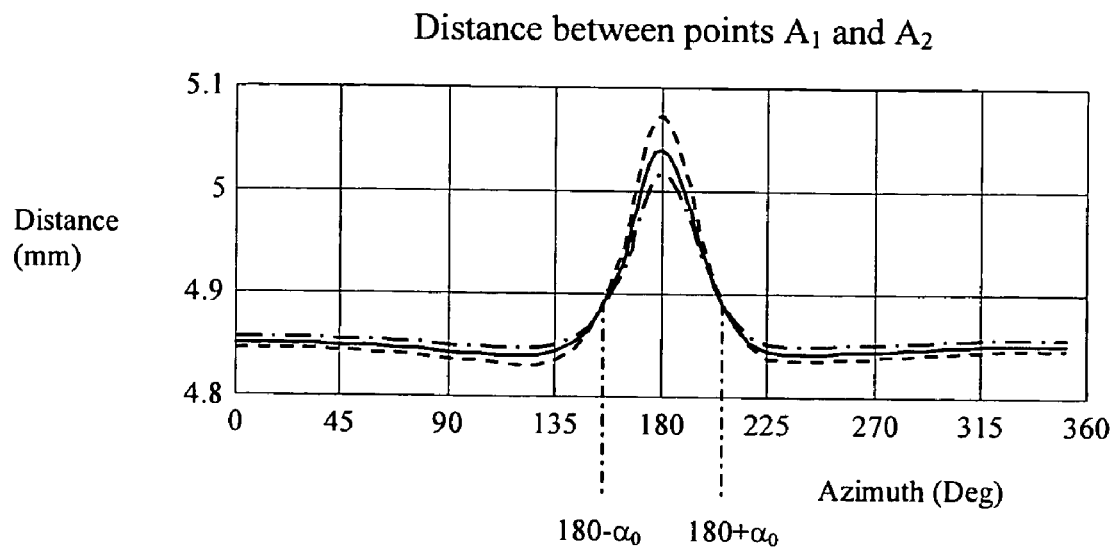
FIGS. 2a and 2b show the effect of the vertical component Fz.
Figure 2B:
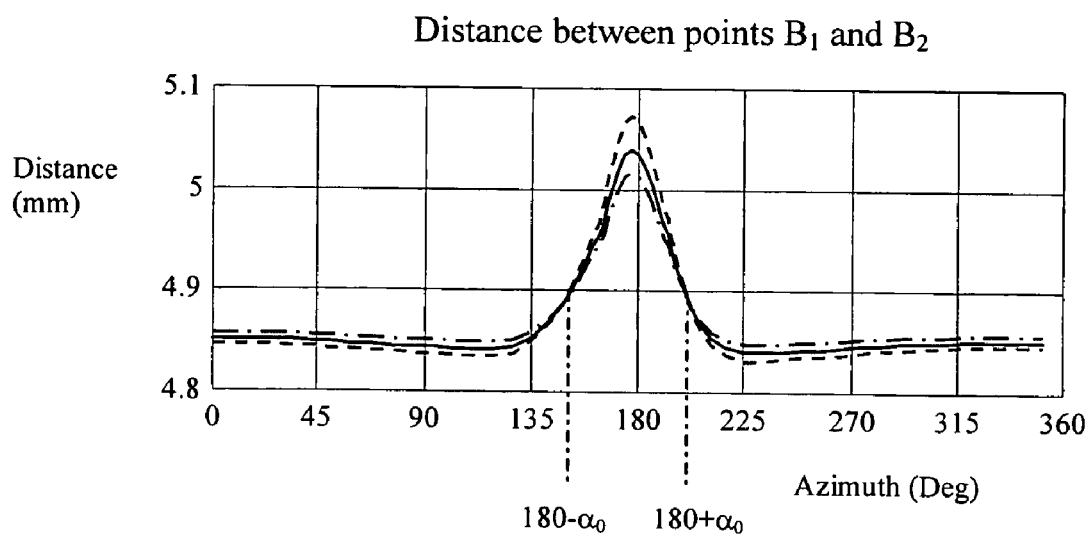

When the tire is subjected to forces, the following effects are observed for each of the components of the said forces:

The vertical component (denoted by Fz) presses the tire onto the ground. By creating a contact area, it leads to a variation of the distance between the two points $A_1$ and $A_2$ when the tire is in rotation, reflecting a modification of the circumferential extension of the sidewalls. FIGS. 2a and 2b indicate the distance which separates points A and points B, respectively, as a function of the azimuth where they lie. Increasing the applied vertical component leads to an extension of both sidewalls in the contact area (the extension due to the vertical component is a maximum near the azimuth 180°) and a contraction of the other zones of the sidewall, principally at the entry and exit of the contact area (decrease in the distance everywhere else, principally near 135° and 225°). This change is a consequence of the increase in the flexure of the tire or the translation of the contact area along the axis Oz towards the axis of rotation of the wheel.

The horizontal component in the rolling direction (denoted by Fx) causes differentiation between the zones situated at the entry and exit of the contact area. This entails a change in the extension of the sidewalls, essentially at the entry and exit of the contact area. FIGS. 3a and 3b illustrate the effects of the component Fx of the applied forces by indicating the distance which separates points A and points B, respectively, as a function of the azimuth where they lie. When a positive force Fx is applied (driving torque), both sidewalls are compressed in the circumferential direction at the entry of the contact area and in extension at the exit of the contact area (Decrease in the distance near about 135° and increase near about 225°). When a negative force Fx is applied (braking torque), both sidewalls are compressed in the circumferential direction at the exit of the contact area and in extension at the entry (Decrease in the distance near 225° and increase near 135°). This change in the signals reflects the front-to-back movement of the contact area with respect to the axis of rotation, that is to say a translation along the axis Ox.

The horizontal component in the transverse direction (denoted by Fy) principally causes differentiation between the two sidewalls. FIGS. 4a and 4b illustrate the effects of this type of constraint by indicating the distance which separates points A and points B, respectively, as a function of the azimuth where they lie. In the case of a constraint with positive Fy, one of the sidewalls is principally put into circumferential extension (increase in the distance between $A_1$ and $A_2$), and the other sidewall is put into circumferential contraction (decrease in the distance between $B_1$ and $B_2$). This change in the signals expresses the lateral movement (offset) of the contact area, that is to say a translation along the axis Oy.

The self-alignment torque N (moment about the vertical axis) is not, strictly speaking, another force acting between the tread of the tire and the road. Rather, it is a consequence of the way in which the components Fx, Fy and Fz are applied in the contact area. If the point of application of the resultant whose components are Fx, Fy and Fz is not the center of the contact area, this resultant generates a moment about Oz which is referred to as the self-alignment torque. The existence of this moment principally entails a rotation of the contact area about Oz. The consequence of this effect is, for example, a circumferential extension at the entry of the contact area and a circumferential contraction at the exit of the contact area on one sidewall, whereas on the other sidewall, a circumferential contraction is observed at the entry of the contact area and a circumferential extension is observed at the exit of the contact area, with respect to a situation with zero self-alignment torque.

When a constraint which mixes components Fx, Fy and Fz is applied, a superposition of the overall deformations, and therefore of the aforementioned effects on the extension in the circumferential direction is observed. One of the advantages of the proposed method is that it permits the contributions of each component of the applied constraint to be separated, so as to make it possible to estimate each of these components.

In the event that a camber angle is applied to the tire, the behavior of the two sidewalls is different. Simplistically, everything happens as if one sidewall were carrying more load than the other. FIG. 5 illustrates this behavior by comparing a cross section of the part of the tire in the contact area without any camber and with a camber γ. This also results in a slight lateral movement of the contact area, which entails a thrust in the Y direction. FIGS. 6a and 6b show the change of the circumferential deformation in the two sidewalls. On the overloaded sidewall (points A), the change is similar to that of an increase in the load. On the other sidewall (points B), a change is seen which is compatible with a decrease in the load being supported. This change in the signals corresponds to a rotation of the contact area about the axis Ox.

Before continuing, it should be pointed out that the extension signal as a function of the azimuth, s(θ), can then be divided into two signals $s_p(\theta)$ and $s_i(\theta)$, which are such that:

$$s(\theta) = s_p(\theta) + s_i(\theta)$$

$$s_i(\theta) = -s_i(-\theta)$$

$$s_p(\theta) = s_p(-\theta),$$

in which $s_i$ is referred to as the odd part of the signal s, and $s_p$ is referred to as the even part of the signal s.

Likewise, let $s^1(\theta)$ and $s^2(\theta)$ be the signals associated with the measurement of the circumferential extension on each of the sidewalls of the tire, and let $S_p^1$, $S_i^1$, $S_p^2$, $S_i^2$ be their resolutions into an azimuth-related even part and an azimuth-related odd part. The following are defined:

$$s_p^p(\theta) = \frac{s_p^1(\theta) + s_p^2(\theta)}{2}$$

$$s_p^i(\theta) = \frac{s_p^1(\theta) - s_p^2(\theta)}{2}$$

$$s_i^p(\theta) = \frac{s_i^1(\theta) + s_i^2(\theta)}{2}$$

$$s_i^i(\theta) = \frac{s_i^1(\theta) + s_i^2(\theta)}{2}$$

$s_p^p$ is referred to as the sidewall-related even and azimuth-related even part.

$s_p^i$ is referred to as the sidewall-related odd and azimuth-related even part.

$s_i^p$ is referred to as the sidewall-related even and azimuth-related odd part.

$s_i^i$ is referred to as the sidewall-related odd and azimuth-related odd part.

Owing to their orientations, the forces Fx, Fy, Fz and the self-alignment torque N are linked with certain symmetries. In particular, this principle can be used to decouple the effects of the force components on the tire.

By virtue of these observations, the method explained here proposes to carry out measurements of the circumferential extension on at least one sidewall of the tire. With the aid of mathematical operations (linear or non-linear combinations of the measurements carried out at the various azimuths), these measurements make it possible to estimate the values of the signals $s_i^p$ $s_p^i$ $s_p^p$ and $s_i^i$ at certain azimuths, and thereby to provide an evaluation components of the applied force.

FIGS. 6a and 6b will again be considered. Given that the change is odd when moving from on sidewall to the other and even in relation to the azimuths, it is readily possible to distinguish an effect of the camber from an effect of Fx, Fz and N. FIGS. 4 and 6 show that the consequences of Fy and of the camber are not identical; it is therefore possible to distinguish between translation of the contact area along Oy and rotation of the contact area about Ox.

The apparent rigidity of a tire originates both from its pneumatic behavior (from its inflation pressure) and from its structural rigidity (rigidity of its architecture). The measured circumferential deformation signals themselves also contain a pneumatic component and a structural component. For example, the deformation signals of a tire inflated to 2 bar and loaded with 400 daN along Z are not identical to those delivered by the same tire at 2.5 bar and loaded with 500 daN. This difference corresponds to the structural contribution, and can make it possible to estimate the inflation pressure of the tire.

In the event that the inflation pressure varies, the relationships which link the applied forces and the deformation signals are quantitatively modified, but without their nature being changed. The method may thus be explained firstly in the case of an inflation pressure which is assumed to be constant, for the sake of simplicity. Likewise, it will be considered below that the camber is constant and zero, in order to make the explanation clearer, and only the most interesting cases concerning this parameter will be mentioned.

The invention is based on the following observation: A simplified tire provided with a single continuous rib will be considered. FIGS. 7 and 8 represent such a tire. In the zone of the contact area, the rib is subjected to a vertical stress which presses it against the ground. This is often referred to as flattening, in the footprint of the tire on the ground. If there is no drift of the tire, a straight line formed by reference points which are taken on the rib so that they are aligned in the footprint of contact with the ground then lie, when the tire rotates, in a plane which contains the said straight line defined when the points were in the contact footprint. If a drift angle is applied to the tire when it is rolling, the plane containing the said reference points when they are sufficiently far away from the contact footprint on the ground forms an angle equal to the slip angle with the reference points when they are aligned in the footprint of contact with the ground. The solid line in FIG. 9 shows the rib seen from above with no drift, and the dotted line shows the rib with an imposed drift. The more the contact area is pressed in, the more the rib is sheared and the greater is the lateral stress which is applied. If the drift angle is sufficient, there is a point $G_1$ in the contact area where this lateral stress becomes greater than the maximum grip potential $\mu_1$, and the rib starts to slip. This situation is represented by dots and dashes in FIG. 9.

The lateral force $Fy_1$ generated by the tire is equal to the integral of the lateral stress in the contact area.

If the tire is placed at a position where the maximum grip potential $\mu_2$ is less than $\mu_1$, it is necessary to increase the drift angle so that the tire generates the same thrust force Fy. The slip zone then starts at the point $G_2$ closer to the entry of the contact area. FIG. 10 allows the two situations to be compared.

Between these two configurations, the lateral forces are the same (same area under the curve) but the point of application of the force Fy has been moved. The more the maximum grip potential decreases, that is to say the more the grip coefficient decreases, the more the point of application of the lateral force is moved towards the entry of the contact area.

One consequence is that, for the same lateral force Fy, the deformations of the tire differ because of a movement of the point of application of the force. The contact area is translated laterally in the same way along Oy, but it does not undergo the same rotation about Oz. These differences in deformation will be utilized to estimate the maximum grip coefficient.

A relationship has now been established between the overall deformations of the tire, on the one hand, the overall forces applied to the tire, on the other hand, and the maximum grip coefficient. However, in order to have as much information as possible available for estimating the grip coefficient throughout the range of constraint, $\mu$ is estimated directly on the basis of the deformation measurements carried out on the tire, without the intermediate step of estimating the forces on the basis of which $\mu$ is subsequently intended to be estimated (FIG. 11).

In particular, it is possible to use the measurement of the circumferential extension of the sidewalls of the tire in order to estimate the maximum grip potential. Indeed, and as already seen above, the evaluation of the maximum grip potential uses the positioning of the point of application of the forces Fx and Fy. If the constraint is sufficient (existence of a slip zone in the contact area) this point of application moves in the contact area as a function of the grip potential, causing a modification of the geometrical positioning of the contact area and therefore a modification of the circumferential extension. Measurement of the circumferential extension of the sidewalls at a plurality of azimuths makes it possible to obtain an estimate of the maximum grip coefficient, by carrying out suitable signal processing, as will be explained in detail.

Among the many possible variants for measuring the circumferential extension, the following approaches should be noted:

Measurement of the circumferential extension of the sidewalls by sensor(s) integrated into the side wall(s) of the tire. Such a sensor rotates with the tire, so that it runs through all the azimuths and, if it is known how to position it, it allows measurement at all the azimuths. In this case, in order to have at one's disposal values of circumferential extension at a plurality of azimuths, a steady-state assumption for the forces and $\mu$ during a fraction of a wheel revolution may be used in order to use the values given by the same sensor at different azimuths (saving on the number of sensors), or it is possible to favor the response time and equip the tire with a plurality of sensors placed at different azimuths. Any combination is of course possible.

Measurement of the circumferential extension of the sidewalls by sensor(s) external to the tire. In this case, sensors external to the tire observe the sidewalls and make it possible to measure the circumferential extension. A number of sensors equal to the number of azimuths to be observed is a priori necessary.

In the event that one or more sensors placed in the tire are used, it is for example possible to estimate the circumferential variation by measuring the distance between wires forming a sensor, which is integrated with the sidewalls and measures a variation in capacitance linked with the distance separating two electrodes.

The azimuth $\theta$ will be defined as the angle at which the circumferential extension of the sidewalls is being analyzed. The origin of the azimuth is taken on the opposite side from the center of the contact area. The center of the contact area therefore has the azimuth 180°.

FIGS. 12a, 12b and 12c present examples of the change in the circumferential extension signals which are obtained by a sensor installed in the sidewall of a tire. The tire bears a load of 400 daN and is not subject to any driving or braking torque. FIG. 12a corresponds to driving in a straight line (Fy=0 daN), FIG. 12b to a lateral thrust Fy=80 daN and FIG. 12c to a lateral thrust of 120 daN. The solid curve presents the signals which are obtained on a ground with a grip coefficient of 0.4, and the dotted curve to those on a ground surface with a grip coefficient of 1. This example demonstrates an effect of the grip coefficient on the circumferential extension signals.

For the sake of explanation, the values of the signals at the azimuths corresponding to the minima before and after passing through the azimuth 180° will be considered. V1 and V2 will denote the values of the signals at these azimuths. From what has been seen above, V1+V2 is principally linked with the lateral thrust, and therefore with the offset of the contact area (translation along Oy). V2−V1 is an indicator of the self-alignment torque, and is therefore linked with the rotation of the contact area about Oz. FIG. 13 represents V2−V1 as a function of V1+V2 for different lateral thrusts, the load being set at 400 daN and with no driving or braking torque. The solid curve corresponds to a grip coefficient of 0.4 and the dotted curve corresponds to a maximum grip coefficient of 1. This figure shows that the grip coefficient can be discerned on the basis of V1 and V2 under the driving conditions in question.

In more general cases, in order to record the changes in the circumferential extension properly, the measurements have to be carried out at expediently selected azimuths. In particular, and by way of non-limiting example, the following cases may be indicated:

Measurement at three azimuths on both sidewalls. One azimuth selected at the entry of the contact area (for example between azimuths 100° and 150°), one measurement at 180° (center of the contact area) and one measurement at the exit of the contact area, at the azimuth which is symmetrical to the one used at the entry. This gives a total of six values of circumferential extension, on the basis of which it is possible to estimate the maximum grip coefficient.

Measurement at seven azimuths on a single sidewall. The first three lie at the entry of the contact area, the fourth at 180° at the center of the contact area and the last three being symmetrical to the first three in relation to the center of the contact area.

In order to establish the transfer function between the circumferential extension measurements at a plurality of azimuths and the maximum grip coefficient, it is for example possible to use a neural network, of the perceptron type with a hidden layer, used as an approximator. Any other mathematical function permitting this type of approximation may of course be used. FIG. 14 represents one of the network architectures enabling the maximum grip coefficient to be estimated. The neural network is here made up of a number of inputs equal to the number of measurement azimuths, a layer of hidden neurons with a sigmoid activation function and a linear output layer.

Numerous systems for measuring pressure of tires during use are now available, and make it possible to measure it while driving. If such systems are available, the pressure may be used as an extra input of the transfer function, as indicated by FIG. 15. Of course, other quantities may be introduced at the input of the transfer function in order to improve its performance (for example, and without implying any limitation, the camber, the speed of the vehicle, . . . ).

The case in which a neural network is used for forming the transfer function will be considered. The procedure adopted for constructing the function is as follows:

The first step consists in compiling a database containing the values of the circumferential extensions at the selected azimuths (or any representative value), which will represent the inputs of the transfer function, and containing $\mu$. It is possible to construct such a data base either with the aid of a measurement machine (the advantage is being able to constrain the tire with independent forces Fx, Fy, Fz and varying the grip coefficient) or on the vehicle by using, for example, a dynamometric wheel (for measuring the forces) and by driving over different grounds.

In the event that the future use of the system is to take place under conditions of variable camber and/or pressure, it is essential for the data base used in this step to contain camber angles and pressures representative of the future conditions of use.

In the second step a transfer function is sought with the aid of this database, $\mu$ being the output of the transfer function. In the case when a neural network is used, this is the training phase.

The third step consists in checking that the transfer function which is obtained works correctly throughout the desired range, that is to say checking that it is generalisable.

In all cases, the proposed method for estimating the maximum grip coefficient requires that the tire be constrained by forces Fx, Fy, or both combined. In fact, it is absolutely necessary that there be a slip region in the contact area, in order for the presented approach to be applied. This method ensures that an estimate of the grip limit can be obtained before the latter is reached. When the tire is being constrained very little, however, the estimate is imprecise or wrong (lack of slip in the contact area). For this reason, it is proposed to consider the percentage of grip potential being used, which is defined in the following way:

$$p_u = \frac{\mu_{used}}{\mu} = \frac{\sqrt{F_x^2 + F_y^2}}{\mu \cdot F_z}$$

The approach proposed here consists in directly determining the percentage $p_u$ on the basis of the circumferential extension measurements. As for the determination of $\mu$, the following procedure may be adopted.

The first step consists in compiling a data base containing the values of the circumferential extensions at the selected azimuths (or any representative value), which will represent the inputs of the transfer function, and containing $p_u$ (output of the transfer function) for a set of constraints. It is possible to construct such a data base either with the aid of a measurement machine (the advantage is being able to constrain the tire by independent forces Fx, Fy, Fz and varying the grip coefficient) or on the vehicle by using, for example, a dynamometric wheel (for measuring the forces) and by driving over different grounds.

In a second step a transfer function is sought with the aid of this database, $p_u$ being the output of the transfer function. In the case when a neural network is used, this is the training phase.

The third step consists in checking that the transfer function which is obtained works correctly throughout the desired range, that is to say checking that it is generalisable.

The proposed percentage has the benefit of being easier to estimate correctly as an absolute value regardless of the constraint, even if it is small, being applied to the tire. It is obtained directly, for example using a neural network, by applying the approach presented for the estimation of $\mu$. FIG. 16 presents an example of reconstructing the maximum grip potential and the percentage potential used. The driving or braking torque (slip associated with Fx) and the transverse force (drift angle associated with Fy) vary as a function of time as well as the ground on which the vehicle is driving. The load Fz is imposed. When the constraint of the tire is small (Fx and Fy simultaneously small), at around 4 s, the quality of the estimate of the maximum grip potential drops. The estimate of percentage potential used, for its part, remains quite correct.

In the context of use by a system fitted on-board a vehicle (a system such as ESP or ABS) it is beneficial to have available a quantity defined throughout the range of use. It is, for example, conceivable to use the percentage grip potential being used, in order to refine the control mechanisms of ABS or ESP systems.

What is claimed is:

1. A method of determining the grip coefficient μ in the contact area of a tire of a vehicle on a road, comprising the steps of:
   selecting a plurality of points in space that are fixed in a reference frame associated with the vehicle, which plurality of points lie at mutually different azimuths along a circumference in at least one sidewall of the tire,
   obtaining a corresponding number of measurements of circumferential distance variation at the plurality of points when the tire is rolling on the road, the measurements producing measurement signals, and
   determining from the measurement signals a grip coefficient μ for the tire contact area on the road.

2. The method according to claim 1, wherein the method comprises selecting at least 5 points, obtaining at least 5 measurements of circumferential distance variation in at least one sidewall of the tire, and determining the grip coefficient μ from said at least 5 measurements.

3. The method according to claim 1, wherein the step of obtaining the measurement of the circumferential distance variation is carried out by at least one sensor integrated in a sidewall of the tire, wherein a signal delivered by the sensor is processed to acquire a value of the signal at a plurality of azimuths corresponding to the points.

4. The method according to claim 1, wherein the step of obtaining the measurement of the circumferential distance variation is carried out by a plurality of sensors equal in quantity to a quantity of azimuths observed, the sensors being external to the tire and arranged in fixed space.

5. The method according to claim 1, wherein the step of obtaining measurements is carried out at three azimuths on each of the two sidewalls, the azimuths being at an entry of the contact area, at 180° to contact, and at an exit of the contact area symmetrical to the azimuth at the entry of the contact area.

6. The method according to claim 1, wherein the step of obtaining measurements is carried out at seven azimuths on a single sidewall, a first three azimuths lying at the entry of the contact area, a fourth at 180° relative to a center of the contact area and a last three being symmetrical to the first three with respect to the center of the contact area.

7. The method according to claim 1, further comprising the step of forming a transfer function between the measurements and the maximum grip coefficient by the following steps:
   compiling a database containing the measured values of the circumferential distance variations at the selected azimuths and the associated values of μ, all the values being acquired experimentally, and,
   forming a transfer function from this database, μ being the output of the transfer function.

8. The method according to claim 7, wherein the transfer function is formed using a neural network of the perceptron type with a hidden layer used as an approximator.

9. The method according to claim 1, wherein the circumferential variation is estimated by measuring the distance between the threads of the carcass ply in the sidewalk.

10. The method according to claim 1, wherein the circumferential variation is estimated by measuring the distance between wires forming a sensor which measures a variation in capacitance linked with the distance separating two electrodes.

11. The method according to claim 1, further comprising determining a percentage grip potential, defined by $$p_u = \frac{\mu_{used}}{\mu} = \frac{\sqrt{F_x^2 + F_y^2}}{\mu \cdot F_x},$$

by the steps of:
   compiling a data base containing the values of circumferential extensions at the selected azimuths for a predetermined set of constraints of the tire,
   forming a transfer function from the data base, wherein $P_u$ is the output of the transfer function, and wherein the values of the circumferential extensions are the inputs of the transfer function, and,
   verifying that the transfer function which is obtained works correctly throughout the desired range of constraints.

* * * * *

UNITED STATES PATENT AND TRADEMARK OFFICE
CERTIFICATE OF CORRECTION

PATENT NO.         : 7,099,765 B2
APPLICATION NO. : 10/911047
DATED                  : August 29, 2006
INVENTOR(S)       : David Bertrand It is certified that error appears in the above-identified patent and that said Letters Patent is hereby corrected as shown below:

DRAWING SHEET 8

Figure 11, "tyre" should read --tire--.

COLUMN 3

Line 47, "applied," should read --applied;--.

COLUMN 4

Line 12, "of 1." should read --of 1;--.
Line 15, "input;" should read --input; and--.
Line 67, "(Decrease" should read --(decrease--.

COLUMN 5

Line 4, "(Decrease" should read --(decrease--.

COLUMN 6

Lines 21-23, " $s_i^i(\theta) = \dfrac{s_i^1(\theta) + s_i^2(\theta)}{2}$ " should read -- $s_i^i(\theta) = \dfrac{s_i^1(\theta) - s_i^2(\theta)}{2}$ --.

Line 46, "on" should read --one--.

COLUMN 10

Line 62, "ABS)" should read --ABS),--.

UNITED STATES PATENT AND TRADEMARK OFFICE
CERTIFICATE OF CORRECTION

PATENT NO. : 7,099,765 B2
APPLICATION NO. : 10/911047
DATED : August 29, 2006
INVENTOR(S) : David Bertrand It is certified that error appears in the above-identified patent and that said Letters Patent is hereby corrected as shown below:

COLUMN 12

Line 8, "and," should read --and--.
Line 16, "sidewalk." should read --sidewalls.--.
Line 37, "and," should read --and--.

Signed and Sealed this

Thirteenth Day of November, 2007

JON W. DUDAS
*Director of the United States Patent and Trademark Office*